(No Model.)
S. G. McFARLAND.
WATER CLOSET AND TRAP.
No. 302,666. Patented July 29, 1884.
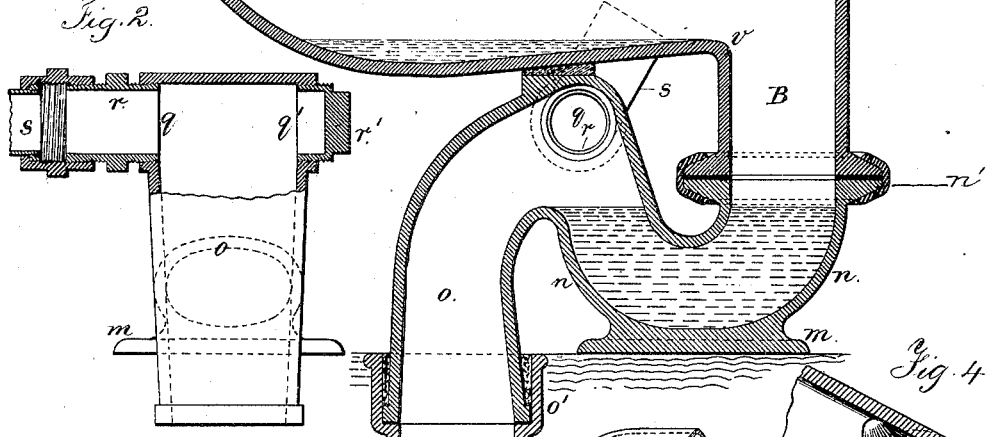
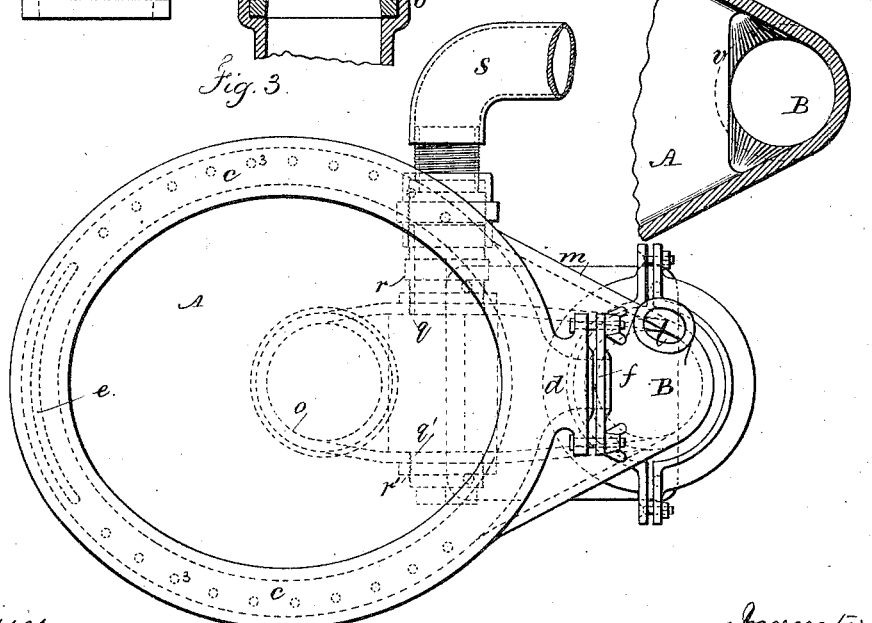
Witnesses
J. Haib
Cho. H. Smith
Inventor
Samuel G. McFarland
per Lemuel W. Serrell
atty

UNITED STATES PATENT OFFICE.

SAMUEL G. McFARLAND, OF NEW YORK, N. Y., ASSIGNOR TO THE J. L. MOTT IRON WORKS, OF SAME PLACE.

WATER-CLOSET AND TRAP.

SPECIFICATION forming part of Letters Patent No. 302,666, dated July 29, 1884.

Application filed April 9, 1883. (No model.)

*To all whom it may concern:*

Be it known that I, SAMUEL G. MCFARLAND, of the city and State of New York, have invented an Improvement in Water-Closets, of which the following is a specification.

Water-closets have been made as a basin with a delivery-pipe at one side, and the bottom has been dishing, so as to retain water, and the rush of water from the hollow rim has carried the contents of the basin bodily to the delivery-pipe, and the trap to the closet has been placed beneath the basin. Closet-basins have also been made with the trap in one piece with the porcelain basin and below the same. In my present improvement the basin is made with the connection for the water-supply pipe above the curved top end of the discharge-pipe, and a hub for a ventilating-pipe is made at one side of the upper end of the discharge-pipe, so as to prevent the ventilating-pipe occupying unnecessary space or coming in the way of the water-supply pipe.

In the drawings, Figure 1 is a section of the closet. Fig. 2 is a cross-section of the trap. Fig. 3 is a plan of the closet basin and trap; and Fig. 4 is a detached section at *x x*.

The basin A is of the general shape heretofore used—that is to say, it is oval—and provided with a delivery-horn, B, at the back to connect with the trap, and with a concave bottom to hold water, and with a hollow upper rim, *c*, and horn *d*, to connect to the supply water-pipe. I make use of a long slot, *e*, that is very narrow, as seen by dotted lines in Fig. 3, and this slot is at the under side of the hollow rim opposite to the delivery to the soil-pipe, so that a thin but powerful sheet of water is projected downwardly from this slot *e* and sweeps the entire contents of the basin off into the delivery-pipe at the opposite side of the basin; thence through the trap to the soil-pipe. In order to wash the inclined portions of the basin, at the inner sides thereof I make use of perforations 3, in the under side of the hollow rim, which, instead of being elongated, as heretofore usual, are round and at an inclination, as shown in Fig. 1, so that the jets of water passing from these holes will be projected toward the discharge or delivery pipe, and will not retard the rush of water from orifice *e*.

The horn *d*, to which the water-supply pipe is clamped, is centrally at the rear of the basin, and it is provided with a clamping-ring, *f*, by which the flanged end of the lead pipe is pressed toward the basin, and the joint is made tight with cement. This is the ordinary mode of making the joint; but as the water-pipe passes away to the rear and is usually led up to the cistern, the ventilation-pipe cannot be central above the delivery-pipe. I therefore provide a hollow horn or short tube, *l*, at the upper part of the delivery-pipe, but sufficiently to one side, as shown, to be clear of the water-pipe, and to this horn the ascending pipe for ventilation of the basin is connected. The lower end of the delivery-pipe is made with a rounded flange. So also is the upper end of the trap. These are clamped together by a surrounding concave ring, *n'*, and putty is inserted between the adjoining surfaces.

The trap for the soil-pipe is preferably of metal. It is formed with the base *m*, to rest upon the floor, the curved portion *n*, that holds the water, and the descending leg *o*, that is united with the soil-pipe. At the upper part of the bend, between *o* and *n*, there are lateral openings *q q'*, into one of which is inserted a screw-thimble, *r*, and to either of these lateral openings the ventilating-pipe *s* is connected. This pipe *s* may be coupled by a screw-union, or united in any other convenient manner, and it is taken off from that side of the closet where it will pass the most directly to the ascending ventilating pipe or flue. The opening that is not used for the ventilating-pipe is to be closed by a screw-plug, *r'*.

By this construction of trap I am able to take off the ventilating-pipe in either direction, and the rush of water through the trap carries all solid matter across below the lateral opening, and there is no tendency for any accumulation at the ventilating-opening, and siphoning of the trap is effectually prevented, because the atmosphere is drawn into the soil-pipe immediately behind the water-seal of the trap; hence the water will not be drawn out of the trap, and any movement of air, gases, or water in the soil-pipe will not cause an escape of smell into the room through the water-seal of the trap.

In basins that have heretofore been made the walls are contracted toward the back end and rounded at the bottom, where the dam is formed, over which the excrement is carried by the wash of the water. The consequence is that the rounded sides at the dam become soiled and the discharge is obstructed. To prevent this, I make the dam $v$ level, or nearly so, and straight across, as shown in the detached sectional view, Fig. 4, and the sides of the basin are nearly vertical. They, however, converge toward the sides of the discharge-pipe. In consequence of this manner of constructing the dam, there is a broad space leading to the discharge-pipe, so that the contents of the basin will not come into contact with the sides, but will be carried bodily over the dam.

I do not herein claim the trap with the ventilating-pipe below the closet, the same being in an application, No. 113,391, filed by me December 3, 1883.

I claim as my invention—

A water-closet basin having a concave bottom, a tubular rim, and openings for the flushing-water, a single central connection at the back for the water-supply pipe, a vertical discharge-pipe, with a closed rounding upper end at the back of the closet and below the water-supply pipe, and a short tube passing off at one side of and near the upper end of the discharge-pipe, so as to receive the ventilating-pipe and be clear of the water-supply pipe, substantially as specified.

Signed by me this 6th day of April, A. D. 1883.

SAMUEL G. McFARLAND.

Witnesses:
 GEO. T. PINCKNEY,
 WILLIAM G. MOTT.